US009556890B2

(12) United States Patent
Colombo et al.

(10) Patent No.: US 9,556,890 B2
(45) Date of Patent: Jan. 31, 2017

(54) ELASTIC ALIGNMENT ASSEMBLY FOR ALIGNING MATED COMPONENTS AND METHOD OF REDUCING POSITIONAL VARIATION

(71) Applicant: GM GLOBAL TECHNOLOGY OPERATIONS LLC, Detroit, MI (US)

(72) Inventors: Joel Colombo, Howell, MI (US); Michael D. Richardson, Troy, MI (US); Steven E. Morris, Fair Haven, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 914 days.

(21) Appl. No.: 13/755,759

(22) Filed: Jan. 31, 2013

(65) Prior Publication Data

US 2014/0208561 A1 Jul. 31, 2014

(51) Int. Cl.
*F16B 1/00* (2006.01)
*F16B 19/02* (2006.01)
*B60R 13/00* (2006.01)

(52) U.S. Cl.
CPC .............. *F16B 1/0071* (2013.01); *F16B 19/02* (2013.01); *B60R 13/005* (2013.01); *Y10T 29/4978* (2015.01); *Y10T 403/20* (2015.01)

(58) Field of Classification Search
CPC ......... F16B 19/002; F16B 5/07; F16B 5/0635; F16B 19/06; B21J 15/00; B21J 15/02; Y10T 29/49956; B21K 25/00
See application file for complete search history.

(56) References Cited

U.S. PATENT DOCUMENTS

| 1,219,398 A | 3/1917 | Huntsman |
| 1,261,036 A | 4/1918 | Kerns |

(Continued)

FOREIGN PATENT DOCUMENTS

| BE | 342302 A | 9/1976 |
| CN | 1036250 A | 10/1989 |

(Continued)

OTHER PUBLICATIONS

"Coupling Types—Elastic Averaging." MIT. Aug. 3, 2012, [online], [retrieved on Nov. 12, 2014]. Retrieved from the Internet <URL:https://web.archive.org/web/20120308055935/http://pergatory.mit.edu/kinematiccouplings/html/about/elastic_averaging.html>.

(Continued)

*Primary Examiner* — Victor MacArthur
(74) *Attorney, Agent, or Firm* — Cantor Colburn LLP

(57) ABSTRACT

An elastic alignment assembly includes a first component having a first engagement surface. Also included is a second component having a second engagement surface and is configured to be mated with the first component. Further included is a receiving feature formed in at least one of the first engagement surface and the second engagement surface. Yet further included is a protrusion comprising a first sidewall and a second sidewall, the protrusion extending away from at least one of the first engagement surface and the second engagement surface, the protrusion formed of an elastically deformable material to elastically deform at a first interface and a second interface upon contact with the receiving feature, wherein the first interface is located proximate the first sidewall and the receiving feature, and wherein the second interface is located proximate the second sidewall and the receiving feature.

10 Claims, 3 Drawing Sheets

(56) References Cited

U.S. PATENT DOCUMENTS

| | | |
|---|---|---|
| 1,301,302 A | 4/1919 | Nolan |
| 1,556,233 A | 10/1925 | Maise |
| 1,819,126 A | 8/1931 | Scheibe |
| 1,929,848 A | 10/1933 | Neely |
| 1,968,168 A | 7/1934 | Place |
| 1,982,076 A | 11/1934 | Spahn |
| 2,006,525 A | 7/1935 | Thal |
| 2,267,558 A | 12/1941 | Birger et al. |
| 2,275,103 A | 3/1942 | Gooch et al. |
| 2,275,900 A | 3/1942 | Hall |
| 2,385,180 A | 9/1945 | Allen |
| 2,482,488 A | 9/1949 | Franc |
| 2,560,530 A | 7/1951 | Burdick |
| 2,612,139 A | 9/1952 | Collins |
| 2,688,894 A | 9/1954 | Modrey |
| 2,693,014 A | 11/1954 | Monahan |
| 2,707,607 A | 5/1955 | O'Connor |
| 2,778,399 A | 1/1957 | Mroz |
| 2,780,128 A | 2/1957 | Rapata |
| 2,862,040 A | 11/1958 | Curran |
| 2,902,902 A | 9/1959 | Slone |
| 2,946,612 A | 7/1960 | Ahlgren |
| 2,958,230 A | 11/1960 | Haroldson |
| 3,005,282 A | 10/1961 | Christiansen |
| 3,014,563 A | 12/1961 | Bratton |
| 3,087,352 A | 4/1963 | Daniel |
| 3,089,269 A | 5/1963 | McKiernan |
| 3,130,512 A | 4/1964 | Van Buren, Jr. |
| 3,152,376 A | 10/1964 | Boser |
| 3,168,961 A | 2/1965 | Yates |
| 3,169,004 A | 2/1965 | Rapata |
| 3,169,439 A | 2/1965 | Rapata |
| 3,188,731 A | 6/1965 | Sweeney |
| 3,194,292 A | 7/1965 | Borowsky |
| 3,213,189 A | 10/1965 | Mitchell et al. |
| 3,230,592 A | 1/1966 | Hosea |
| 3,233,358 A | 2/1966 | Dehm |
| 3,233,503 A | 2/1966 | Birger |
| 3,244,057 A | 4/1966 | Mathison |
| 3,248,995 A | 5/1966 | Meyer |
| 3,291,495 A | 12/1966 | Liebig |
| 3,310,929 A | 3/1967 | Garvey |
| 3,413,752 A | 12/1968 | Perry |
| 3,473,283 A | 10/1969 | Meyer |
| 3,531,850 A | 10/1970 | Durand |
| 3,551,963 A | 1/1971 | Long |
| 3,643,968 A | 2/1972 | Horvath |
| 3,680,272 A | 8/1972 | Meyer |
| 3,800,369 A | 4/1974 | Nikolits |
| 3,841,044 A | 10/1974 | Brown |
| 3,842,565 A | 10/1974 | Brown et al. |
| 3,845,961 A | 11/1974 | Byrd, III |
| 3,847,492 A | 11/1974 | Kennicutt et al. |
| 3,860,209 A | 1/1975 | Strecker |
| 3,895,408 A | 7/1975 | Leingang |
| 3,897,967 A | 8/1975 | Barenyl |
| 3,905,570 A | 9/1975 | Nieuwveld |
| 3,972,550 A | 8/1976 | Boughton |
| 3,988,808 A | 11/1976 | Poe et al. |
| 4,035,874 A | 7/1977 | Liljendahl |
| 4,039,215 A | 8/1977 | Minhinnick |
| 4,042,307 A | 8/1977 | Jarvis |
| 4,043,585 A | 8/1977 | Yamanaka |
| 4,158,511 A | 6/1979 | Herbenar |
| 4,169,297 A | 10/1979 | Weihrauch |
| 4,193,588 A | 3/1980 | Doneaux |
| 4,213,675 A | 7/1980 | Pilhall |
| 4,237,573 A | 12/1980 | Weihrauch |
| 4,300,851 A | 11/1981 | Thelander |
| 4,313,609 A | 2/1982 | Clements |
| 4,318,208 A | 3/1982 | Borja |
| 4,325,574 A | 4/1982 | Umemoto et al. |
| 4,363,839 A | 12/1982 | Watanabe et al. |
| 4,364,150 A | 12/1982 | Remington |
| 4,384,803 A | 5/1983 | Cachia |
| 4,394,853 A | 7/1983 | Lopez-Crevillen et al. |
| 4,406,033 A | 9/1983 | Chisholm et al. |
| 4,477,142 A | 10/1984 | Cooper |
| 4,481,160 A | 11/1984 | Bree |
| 4,527,760 A | 7/1985 | Salacuse |
| 4,575,060 A | 3/1986 | Kitagawa |
| 4,599,768 A | 7/1986 | Doyle |
| 4,605,575 A | 8/1986 | Auld et al. |
| 4,616,951 A | 10/1986 | Maatela |
| 4,648,649 A | 3/1987 | Beal |
| 4,654,760 A | 3/1987 | Matheson et al. |
| 4,745,656 A | 5/1988 | Revlett |
| 4,767,647 A | 8/1988 | Bree |
| 4,805,272 A | 2/1989 | Yamaguchi |
| 4,807,335 A | 2/1989 | Candea |
| 4,817,999 A | 4/1989 | Drew |
| 4,819,983 A | 4/1989 | Alexander et al. |
| 4,865,502 A | 9/1989 | Maresch |
| 4,881,764 A | 11/1989 | Takahashi et al. |
| 4,973,212 A | 11/1990 | Jacobs |
| 4,977,648 A | 12/1990 | Eckerud |
| 5,005,265 A | 4/1991 | Muller |
| 5,039,267 A | 8/1991 | Wollar |
| 5,139,285 A | 8/1992 | Lasinski |
| 5,154,479 A | 10/1992 | Sautter, Jr. |
| 5,165,749 A | 11/1992 | Sheppard |
| 5,170,985 A | 12/1992 | Killworth et al. |
| 5,180,219 A | 1/1993 | Geddie |
| 5,208,507 A | 5/1993 | Jung |
| 5,212,853 A | 5/1993 | Kaneko |
| 5,234,122 A | 8/1993 | Cherng |
| 5,297,322 A | 3/1994 | Kraus |
| 5,339,491 A | 8/1994 | Sims |
| 5,342,139 A | 8/1994 | Hoffman |
| 5,368,427 A | 11/1994 | Pfaffinger |
| 5,368,797 A | 11/1994 | Quentin et al. |
| 5,397,206 A | 3/1995 | Sihon |
| 5,407,310 A | 4/1995 | Kassouni |
| 5,446,965 A | 9/1995 | Makridis |
| 5,507,610 A | 4/1996 | Benedetti et al. |
| 5,513,603 A | 5/1996 | Ang et al. |
| 5,524,786 A | 6/1996 | Skudlarek |
| 5,538,079 A | 7/1996 | Pawlick |
| 5,556,808 A | 9/1996 | Williams et al. |
| 5,566,840 A | 10/1996 | Waldner |
| 5,575,601 A | 11/1996 | Skufca |
| 5,577,301 A | 11/1996 | Demaagd |
| 5,577,779 A | 11/1996 | Dangel |
| 5,580,204 A | 12/1996 | Hultman |
| 5,586,372 A | 12/1996 | Eguchi et al. |
| 5,593,265 A | 1/1997 | Kizer |
| 5,601,453 A | 2/1997 | Horchler |
| 5,629,823 A | 5/1997 | Mizuta |
| 5,634,757 A | 6/1997 | Schanz |
| 5,657,516 A | 8/1997 | Berg et al. |
| 5,667,271 A | 9/1997 | Booth |
| 5,670,013 A | 9/1997 | Huang et al. |
| 5,698,276 A * | 12/1997 | Mirabitur ............ B60R 13/005 156/242 |
| 5,736,221 A | 4/1998 | Hardigg et al. |
| 5,765,942 A | 6/1998 | Shirai et al. |
| 5,775,860 A | 7/1998 | Meyer |
| 5,795,118 A | 8/1998 | Osada et al. |
| 5,797,170 A | 8/1998 | Akeno |
| 5,797,714 A | 8/1998 | Oddenino |
| 5,803,646 A | 9/1998 | Weihrauch |
| 5,806,915 A | 9/1998 | Takabatake |
| 5,810,535 A | 9/1998 | Fleckenstein et al. |
| 5,820,292 A | 10/1998 | Fremstad |
| 5,846,631 A | 12/1998 | Nowosiadly |
| 5,934,729 A | 8/1999 | Baack |
| 5,941,673 A | 8/1999 | Hayakawa et al. |
| 6,073,315 A | 6/2000 | Rasmussen |
| 6,079,083 A | 6/2000 | Akashi |
| 6,095,594 A | 8/2000 | Riddle et al. |
| 6,103,987 A | 8/2000 | Nordquist |
| 6,109,882 A | 8/2000 | Popov |
| 6,164,603 A | 12/2000 | Kawai |
| 6,193,430 B1 | 2/2001 | Culpepper et al. |

(56) References Cited

U.S. PATENT DOCUMENTS

| | | |
|---|---|---|
| 6,199,248 B1 | 3/2001 | Akashi |
| 6,202,962 B1 | 3/2001 | Snyder |
| 6,209,175 B1 | 4/2001 | Gershenson |
| 6,209,178 B1 | 4/2001 | Wiese et al. |
| 6,254,304 B1 | 7/2001 | Takizawa et al. |
| 6,264,869 B1 | 7/2001 | Notarpietro et al. |
| 6,299,478 B1 | 10/2001 | Jones et al. |
| 6,321,495 B1 | 11/2001 | Oami |
| 6,336,767 B1 | 1/2002 | Nordquist et al. |
| 6,345,420 B1 | 2/2002 | Nabeshima |
| 6,349,904 B1 | 2/2002 | Polad |
| 6,351,380 B1 | 2/2002 | Curlee |
| 6,354,815 B1 | 3/2002 | Svihla et al. |
| 6,378,931 B1 * | 4/2002 | Kolluri .................. B60J 1/006 296/146.15 |
| 6,398,449 B1 | 6/2002 | Loh |
| 6,484,370 B2 | 11/2002 | Kanie et al. |
| 6,485,241 B1 | 11/2002 | Oxford |
| 6,523,229 B2 | 2/2003 | Severson |
| 6,523,817 B1 | 2/2003 | Landry, Jr. |
| 6,533,391 B1 | 3/2003 | Pan |
| 6,543,979 B2 | 4/2003 | Iwatsuki |
| 6,557,260 B1 | 5/2003 | Morris |
| 6,568,701 B1 | 5/2003 | Burdack et al. |
| 6,579,397 B1 | 6/2003 | Spain et al. |
| 6,591,801 B1 | 7/2003 | Fonville |
| 6,609,717 B2 | 8/2003 | Hinson |
| 6,637,095 B2 | 10/2003 | Stumpf et al. |
| 6,658,698 B2 | 12/2003 | Chen |
| 6,662,411 B2 | 12/2003 | Rubenstein |
| 6,664,470 B2 | 12/2003 | Nagamoto |
| 6,677,065 B2 | 1/2004 | Blauer |
| 6,692,016 B2 | 2/2004 | Yokota |
| 6,712,329 B2 | 3/2004 | Ishigami et al. |
| 6,746,172 B2 | 6/2004 | Culpepper |
| 6,757,942 B2 | 7/2004 | Matsui |
| 6,799,758 B2 | 10/2004 | Fries |
| 6,821,091 B2 | 11/2004 | Lee |
| 6,840,969 B2 | 1/2005 | Kobayashi et al. |
| 6,857,676 B2 | 2/2005 | Kawaguchi et al. |
| 6,857,809 B2 | 2/2005 | Granata |
| 6,908,117 B1 | 6/2005 | Pickett, Jr. et al. |
| 6,932,416 B2 | 8/2005 | Clauson |
| 6,948,753 B2 * | 9/2005 | Yoshida .................. B60R 13/04 296/1.08 |
| 6,951,349 B2 | 10/2005 | Yokota |
| 6,959,954 B2 | 11/2005 | Brandt et al. |
| 6,966,601 B2 | 11/2005 | Matsumoto et al. |
| 6,971,831 B2 | 12/2005 | Fattori et al. |
| 6,997,487 B2 | 2/2006 | Kitzis |
| 7,000,941 B2 | 2/2006 | Yokota |
| 7,008,003 B1 | 3/2006 | Hirose et al. |
| 7,014,094 B2 | 3/2006 | Alcoe |
| 7,017,239 B2 | 3/2006 | Kurily et al. |
| 7,036,779 B2 | 5/2006 | Kawaguchi et al. |
| 7,055,785 B1 | 6/2006 | Diggle, III |
| 7,055,849 B2 | 6/2006 | Yokota |
| 7,059,628 B2 | 6/2006 | Yokota |
| 7,073,260 B2 | 7/2006 | Jensen |
| 7,089,998 B2 | 8/2006 | Crook |
| 7,097,198 B2 | 8/2006 | Yokota |
| 7,121,611 B2 | 10/2006 | Hirotani et al. |
| 7,144,183 B2 | 12/2006 | Lian et al. |
| 7,172,210 B2 | 2/2007 | Yokota |
| 7,178,855 B2 | 2/2007 | Catron et al. |
| 7,198,315 B2 | 4/2007 | Cass et al. |
| 7,234,852 B2 | 6/2007 | Nishizawa et al. |
| 7,306,418 B2 | 12/2007 | Kornblum |
| 7,322,500 B2 | 1/2008 | Maierholzner |
| 7,344,056 B2 | 3/2008 | Shelmon et al. |
| 7,360,964 B2 | 4/2008 | Tsuya |
| 7,369,408 B2 | 5/2008 | Chang |
| 7,435,031 B2 | 10/2008 | Granata |
| 7,454,105 B2 | 11/2008 | Yi |
| 7,487,884 B2 | 2/2009 | Kim |
| 7,493,716 B2 | 2/2009 | Brown |
| 7,547,061 B2 | 6/2009 | Horimatsu |
| 7,557,051 B2 | 7/2009 | Ryu et al. |
| 7,568,316 B2 | 8/2009 | Choby et al. |
| 7,591,573 B2 | 9/2009 | Maliar et al. |
| D602,349 S | 10/2009 | Andersson |
| 7,614,836 B2 | 11/2009 | Mohiuddin |
| 7,672,126 B2 | 3/2010 | Yeh |
| 7,677,650 B2 | 3/2010 | Huttenlocher |
| 7,727,667 B2 | 6/2010 | Sakurai |
| 7,764,853 B2 | 7/2010 | Yi |
| 7,793,998 B2 | 9/2010 | Matsui et al. |
| 7,802,831 B2 | 9/2010 | Isayama et al. |
| 7,828,372 B2 | 11/2010 | Ellison |
| 7,862,272 B2 | 1/2011 | Nakajima |
| 7,869,003 B2 | 1/2011 | Van Doren et al. |
| 7,883,137 B2 | 2/2011 | Bar |
| 7,922,415 B2 | 4/2011 | Rudduck et al. |
| 7,946,684 B2 | 5/2011 | Drury et al. |
| 8,029,222 B2 | 10/2011 | Nitsche |
| 8,061,861 B2 | 11/2011 | Paxton et al. |
| 8,101,264 B2 | 1/2012 | Pace et al. |
| 8,136,819 B2 | 3/2012 | Yoshitsune et al. |
| 8,162,375 B2 | 4/2012 | Gurtatowski et al. |
| 8,203,496 B2 | 6/2012 | Miller et al. |
| 8,203,843 B2 | 6/2012 | Chen |
| 8,228,640 B2 | 7/2012 | Woodhead et al. |
| 8,249,679 B2 | 8/2012 | Cui |
| 8,261,581 B2 | 9/2012 | Cerruti et al. |
| 8,276,961 B2 | 10/2012 | Kwolek |
| 8,291,553 B2 | 10/2012 | Moberg |
| 8,297,137 B2 | 10/2012 | Dole |
| 8,297,661 B2 | 10/2012 | Proulx et al. |
| 8,312,887 B2 | 11/2012 | Dunn et al. |
| 8,371,788 B2 | 2/2013 | Lange |
| 8,414,048 B1 | 4/2013 | Kwolek |
| 8,444,199 B2 | 5/2013 | Takeuchi et al. |
| 8,572,818 B2 | 11/2013 | Hofmann |
| 8,619,504 B2 | 12/2013 | Wyssbrod |
| 8,677,573 B2 | 3/2014 | Lee |
| 8,695,201 B2 | 4/2014 | Morris |
| 8,720,016 B2 | 5/2014 | Beaulieu |
| 8,726,473 B2 | 5/2014 | Dole |
| 8,746,801 B2 | 6/2014 | Nakata |
| 8,826,499 B2 | 9/2014 | Tempesta |
| 8,833,771 B2 | 9/2014 | Lesnau |
| 8,833,832 B2 | 9/2014 | Whipps |
| 8,834,058 B2 | 9/2014 | Woicke |
| 8,905,812 B2 | 12/2014 | Pai-Chen |
| 8,910,350 B2 | 12/2014 | Poulakis |
| 9,003,891 B2 | 4/2015 | Frank |
| 9,039,318 B2 | 5/2015 | Mantei et al. |
| 9,050,690 B2 | 6/2015 | Hammer et al. |
| 9,061,715 B2 | 6/2015 | Morris |
| 9,062,991 B2 | 6/2015 | Kanagaraj |
| 9,067,625 B2 | 6/2015 | Morris |
| 2001/0030414 A1 | 10/2001 | Yokota |
| 2001/0045757 A1 | 11/2001 | Kanie et al. |
| 2002/0045086 A1 | 4/2002 | Tsuji et al. |
| 2002/0060275 A1 | 5/2002 | Polad |
| 2002/0092598 A1 | 7/2002 | Jones et al. |
| 2002/0136617 A1 | 9/2002 | Imahigashi |
| 2003/0007831 A1 | 1/2003 | Lian et al. |
| 2003/0059255 A1 | 3/2003 | Kirchen |
| 2003/0080131 A1 | 5/2003 | Fukuo |
| 2003/0082986 A1 | 5/2003 | Wiens et al. |
| 2003/0087047 A1 | 5/2003 | Blauer |
| 2003/0108401 A1 | 6/2003 | Agha et al. |
| 2003/0180122 A1 | 9/2003 | Dobson |
| 2004/0028503 A1 | 2/2004 | Charles |
| 2004/0037637 A1 | 2/2004 | Lian et al. |
| 2004/0131896 A1 | 7/2004 | Blauer |
| 2004/0139678 A1 | 7/2004 | Pervan |
| 2004/0140651 A1 | 7/2004 | Yokota |
| 2004/0208728 A1 | 10/2004 | Fattori et al. |
| 2004/0262873 A1 | 12/2004 | Wolf et al. |
| 2005/0016116 A1 | 1/2005 | Scherff |
| 2005/0031946 A1 | 2/2005 | Kruger et al. |
| 2005/0054229 A1 | 3/2005 | Tsuya |

(56) References Cited

U.S. PATENT DOCUMENTS

| | | |
|---|---|---|
| 2005/0082449 A1 | 4/2005 | Kawaguchi et al. |
| 2005/0109489 A1 | 5/2005 | Kobayashi |
| 2005/0156409 A1 | 7/2005 | Yokota |
| 2005/0156410 A1 | 7/2005 | Yokota |
| 2005/0156416 A1 | 7/2005 | Yokota |
| 2005/0244250 A1 | 11/2005 | Okada et al. |
| 2006/0092653 A1 | 5/2006 | Tachiiwa et al. |
| 2006/0102214 A1 | 5/2006 | Clemons |
| 2006/0110109 A1 | 5/2006 | Yu |
| 2006/0113755 A1 | 6/2006 | Yokota |
| 2006/0125286 A1 | 6/2006 | Horimatsu et al. |
| 2006/0141318 A1 | 6/2006 | MacKinnon et al. |
| 2006/0163902 A1 | 7/2006 | Engel |
| 2006/0170242 A1 | 8/2006 | Forrester et al. |
| 2006/0197356 A1 | 9/2006 | Catron et al. |
| 2006/0202449 A1 | 9/2006 | Yokota |
| 2006/0237995 A1 | 10/2006 | Huttenlocher |
| 2006/0249520 A1 | 11/2006 | DeMonte |
| 2006/0264076 A1 | 11/2006 | Chen |
| 2007/0034636 A1 | 2/2007 | Fukuo |
| 2007/0040411 A1 | 2/2007 | Dauvergne |
| 2007/0113483 A1 | 5/2007 | Hernandez |
| 2007/0113485 A1 | 5/2007 | Hernandez |
| 2007/0126211 A1 | 6/2007 | Moerke et al. |
| 2007/0137018 A1 | 6/2007 | Aigner et al. |
| 2007/0144659 A1 | 6/2007 | De La Fuente |
| 2007/0205627 A1 | 9/2007 | Ishiguro |
| 2007/0227942 A1 | 10/2007 | Hirano |
| 2007/0251055 A1 | 11/2007 | Gerner |
| 2007/0274777 A1 | 11/2007 | Winkler |
| 2007/0292205 A1 | 12/2007 | Duval |
| 2008/0014508 A1 | 1/2008 | Van Doren et al. |
| 2008/0018128 A1 | 1/2008 | Yamagiwa et al. |
| 2008/0073888 A1 | 3/2008 | Enriquez |
| 2008/0094447 A1* | 4/2008 | Drury .................. B41J 2/14 347/49 |
| 2008/0128346 A1 | 6/2008 | Bowers |
| 2008/0217796 A1 | 9/2008 | Van Bruggen et al. |
| 2008/0260488 A1 | 10/2008 | Scroggie et al. |
| 2009/0028506 A1 | 1/2009 | Yi et al. |
| 2009/0072591 A1 | 3/2009 | Baumgartner |
| 2009/0091156 A1 | 4/2009 | Neubrand |
| 2009/0093111 A1 | 4/2009 | Buchwalter et al. |
| 2009/0126168 A1 | 5/2009 | Kobe et al. |
| 2009/0134652 A1 | 5/2009 | Araki |
| 2009/0141449 A1 | 6/2009 | Yeh |
| 2009/0174207 A1 | 7/2009 | Lota |
| 2009/0243172 A1 | 10/2009 | Ting et al. |
| 2009/0265896 A1 | 10/2009 | Beak |
| 2009/0309388 A1 | 12/2009 | Ellison |
| 2010/0001539 A1 | 1/2010 | Kikuchi et al. |
| 2010/0021267 A1 | 1/2010 | Nitsche |
| 2010/0061045 A1 | 3/2010 | Chen |
| 2010/0102538 A1 | 4/2010 | Paxton et al. |
| 2010/0134128 A1* | 6/2010 | Hobbs ............... G01R 31/2889 324/750.28 |
| 2010/0147355 A1 | 6/2010 | Shimizu et al. |
| 2010/0232171 A1 | 9/2010 | Cannon |
| 2010/0247034 A1 | 9/2010 | Yi et al. |
| 2010/0263417 A1 | 10/2010 | Schoenow |
| 2010/0270745 A1 | 10/2010 | Hurlbert et al. |
| 2010/0307848 A1 | 12/2010 | Hashimoto |
| 2011/0012378 A1 | 1/2011 | Ueno et al. |
| 2011/0036542 A1 | 2/2011 | Woicke |
| 2011/0076588 A1 | 3/2011 | Yamaura |
| 2011/0083392 A1 | 4/2011 | Timko |
| 2011/0103884 A1 | 5/2011 | Shiomoto et al. |
| 2011/0119875 A1 | 5/2011 | Iwasaki |
| 2011/0131918 A1 | 6/2011 | Glynn |
| 2011/0154645 A1 | 6/2011 | Morgan |
| 2011/0175376 A1 | 7/2011 | Whitens et al. |
| 2011/0183152 A1 | 7/2011 | Lanham |
| 2011/0191990 A1 | 8/2011 | Beaulieu |
| 2011/0207024 A1 | 8/2011 | Bogumil et al. |
| 2011/0239418 A1 | 10/2011 | Huang |
| 2011/0239865 A1 | 10/2011 | Huang |
| 2011/0296764 A1 | 12/2011 | Sawatani et al. |
| 2011/0311332 A1 | 12/2011 | Ishman |
| 2012/0000291 A1 | 1/2012 | Christoph |
| 2012/0020726 A1 | 1/2012 | Jan |
| 2012/0073094 A1 | 3/2012 | Bishop |
| 2012/0112489 A1 | 5/2012 | Okimoto |
| 2012/0115010 A1 | 5/2012 | Smith et al. |
| 2012/0240363 A1 | 9/2012 | Lee |
| 2012/0251226 A1 | 10/2012 | Liu et al. |
| 2012/0261951 A1 | 10/2012 | Mildner et al. |
| 2012/0301067 A1 | 11/2012 | Morgan |
| 2012/0311829 A1 | 12/2012 | Dickinson |
| 2012/0321379 A1 | 12/2012 | Wang et al. |
| 2013/0019454 A1 | 1/2013 | Colombo et al. |
| 2013/0019455 A1 | 1/2013 | Morris |
| 2013/0027852 A1 | 1/2013 | Wang |
| 2013/0055822 A1 | 3/2013 | Frank |
| 2013/0071181 A1 | 3/2013 | Herzinger et al. |
| 2013/0157015 A1 | 6/2013 | Morris |
| 2013/0212858 A1 | 8/2013 | Herzinger et al. |
| 2013/0269873 A1 | 10/2013 | Herzinger et al. |
| 2013/0287992 A1 | 10/2013 | Morris |
| 2014/0033493 A1 | 2/2014 | Morris et al. |
| 2014/0041176 A1 | 2/2014 | Morris |
| 2014/0041185 A1 | 2/2014 | Morris et al. |
| 2014/0041199 A1 | 2/2014 | Morris |
| 2014/0042704 A1 | 2/2014 | Polewarczyk |
| 2014/0047691 A1 | 2/2014 | Colombo et al. |
| 2014/0047697 A1 | 2/2014 | Morris |
| 2014/0080036 A1 | 3/2014 | Smith et al. |
| 2014/0132023 A1 | 5/2014 | Watanabe |
| 2014/0157578 A1 | 6/2014 | Morris et al. |
| 2014/0159412 A1 | 6/2014 | Morris et al. |
| 2014/0175774 A1 | 6/2014 | Kansteiner |
| 2014/0202628 A1 | 7/2014 | Sreetharan et al. |
| 2014/0208572 A1 | 7/2014 | Colombo et al. |
| 2014/0264206 A1 | 9/2014 | Morris |
| 2014/0292013 A1 | 10/2014 | Colombo et al. |
| 2014/0298638 A1 | 10/2014 | Colombo et al. |
| 2014/0298640 A1 | 10/2014 | Morris et al. |
| 2014/0298962 A1 | 10/2014 | Morris et al. |
| 2014/0300130 A1 | 10/2014 | Morris et al. |
| 2014/0301103 A1 | 10/2014 | Colombo et al. |
| 2014/0301777 A1 | 10/2014 | Morris et al. |
| 2014/0301778 A1 | 10/2014 | Morris et al. |
| 2015/0016918 A1 | 1/2015 | Colombo |
| 2015/0069779 A1 | 3/2015 | Morris et al. |

FOREIGN PATENT DOCUMENTS

| | | |
|---|---|---|
| CN | 1129162 A | 8/1996 |
| CN | 2285844 Y | 7/1998 |
| CN | 1205285 A | 1/1999 |
| CN | 1328521 A | 12/2001 |
| CN | 1426872 A | 7/2003 |
| CN | 2661972 Y | 12/2004 |
| CN | 2679409 Y | 2/2005 |
| CN | 1670986 A | 9/2005 |
| CN | 100573975 C | 9/2005 |
| CN | 1693721 A | 11/2005 |
| CN | 1771399 A | 5/2006 |
| CN | 1774580 A | 5/2006 |
| CN | 1933747 A | 3/2007 |
| CN | 2888807 Y | 4/2007 |
| CN | 1961157 A | 5/2007 |
| CN | 2915389 Y | 6/2007 |
| CN | 101250964 A | 4/2008 |
| CN | 201259846 Y | 6/2009 |
| CN | 201268336 Y | 7/2009 |
| CN | 201310827 Y | 9/2009 |
| CN | 201540513 U | 8/2010 |
| CN | 101821534 | 9/2010 |
| CN | 101930253 A | 12/2010 |
| CN | 201703439 U | 1/2011 |
| CN | 201737062 U | 2/2011 |
| CN | 201792722 U | 4/2011 |
| CN | 201818606 U | 5/2011 |
| CN | 201890285 U | 7/2011 |

(56) References Cited

FOREIGN PATENT DOCUMENTS

| | | |
|---|---|---|
| CN | 102144102 A | 8/2011 |
| CN | 102235402 A | 11/2011 |
| CN | 202079532 U | 12/2011 |
| CN | 102313952 A | 1/2012 |
| CN | 202132326U U | 2/2012 |
| CN | 102756633 | 10/2012 |
| CN | 102803753 A | 11/2012 |
| CN | 102869891 A | 1/2013 |
| CN | 202686206 U | 1/2013 |
| CN | 102939022 A | 2/2013 |
| CN | 202987018 U | 6/2013 |
| CN | 103201525 A | 7/2013 |
| DE | 1220673 B | 7/1966 |
| DE | 2736012 A1 | 2/1978 |
| DE | 3704190 A1 | 12/1987 |
| DE | 3711696 A1 | 10/1988 |
| DE | 3805693 A1 | 2/1989 |
| DE | 3815927 | 11/1989 |
| DE | 9109276 U1 | 7/1991 |
| DE | 4002443 A1 | 8/1991 |
| DE | 4111245 A1 | 10/1991 |
| DE | 9201258 U1 | 3/1992 |
| DE | 29714892 U1 | 10/1997 |
| DE | 29800379 U1 | 5/1998 |
| DE | 69600357 T2 | 12/1998 |
| DE | 10234253 B3 | 4/2004 |
| DE | 102008005618 A1 | 7/2009 |
| DE | 102008047464 A1 | 4/2010 |
| DE | 102010028323 A1 | 11/2011 |
| DE | 102011050003 A1 | 10/2012 |
| DE | 102012212101 B3 | 7/2013 |
| EP | 0118796 | 9/1984 |
| EP | 1132263 A1 | 9/2001 |
| EP | 1243471 A2 | 9/2002 |
| EP | 1273766 A1 | 1/2003 |
| EP | 1293384 A2 | 3/2003 |
| EP | 1384536 A2 | 1/2004 |
| EP | 1388449 A1 | 2/2004 |
| EP | 1452745 A1 | 9/2004 |
| EP | 2166235 A2 | 3/2010 |
| EP | 2450259 A1 | 5/2012 |
| EP | 2458454 A1 | 5/2012 |
| FR | 1369198 A | 8/1964 |
| FR | 2009941 A1 | 2/1970 |
| FR | 2750177 A2 | 12/1997 |
| FR | 2942749 A1 | 9/2010 |
| FR | 2958696 A1 | 10/2011 |
| GB | 2281950 A | 3/1995 |
| JP | 2000010514 A | 1/2000 |
| JP | 2001141154 A | 5/2001 |
| JP | 2001171554 A | 6/2001 |
| JP | 2005268004 | 9/2005 |
| JP | 2006205918 | 8/2006 |
| JP | 2008307938 A | 12/2008 |
| JP | 2009084844 | 4/2009 |
| JP | 2009187789 A | 8/2009 |
| JP | 2011085174 A | 4/2011 |
| JP | 2012060791 A | 3/2012 |
| JP | 2012112533 A | 6/2012 |
| KR | 20030000251 A1 | 1/2003 |
| WO | 9602963 A1 | 2/1996 |
| WO | 0055517 A2 | 3/2000 |
| WO | 0132454 A3 | 11/2001 |
| WO | 2004010011 01 | 1/2004 |
| WO | 2008140659 A1 | 11/2008 |
| WO | 2010105354 A1 | 9/2010 |
| WO | 2011025606 | 3/2011 |
| WO | 2013191622 A1 | 12/2013 |

OTHER PUBLICATIONS

U.S. Appl. No. 13/939,503, filed Jul. 11, 2013, entitled "Elastically Averaged Alignment Systems and Methods," inventor: Joel Colombo.

U.S. Appl. No. 13/940,912, filed Jul. 12, 2013, entitled "Alignment Arrangement for Mated Components and Method", inventors: Steven E. Morris and Jennifer P. Lawall.

U.S. Appl. No. 13/945,231, filed Jul. 18, 2013, entitled "Lobular Elastic Tube Alignment System for Providing Precise Four-Way Alignment of Components", Inventors: Steven E. Morris and Jennifer P. Lawall.

U.S. Appl. No. 13/954,198, filed Jul. 30, 2013, entitled "Elastic Alignment and Retention System and Method," inventors: Steven E Morris, Edward D. Groninger, and Raymond J. Chess.

U.S. Appl. No. 13/966,523, filed Aug. 14, 2013, entitled "Elastically Averaged Alignment Systems and Methods Thereof," inventors: Steven E. Morris, Jennifer P. Lawall and Joel Colombo.

U.S. Appl. No. 13/973,587, filed Aug. 22, 2013, entitled "Elastic Averaging Alignment System and Method," inventors: Steven E Morris and Jennifer P. Lawall.

U.S. Appl. No. 13/974,729, filed Aug. 23, 2013, entitled "Elastic Averaging Snap Member Aligning and Fastening System", inventors: Steven E Morris and Jennifer P. Lawall.

U.S. Appl. No. 14/012,205, filed Aug. 28, 2013, entitled "Elastically Deformable Alignment Fastener and System," inventors: Steven E. Morris, Marc J. Tahnoose, Michael E. McGuire and Jennifer P. Lawall.

U.S. Appl. No. 14/021,282, filed Sep. 9, 2013, entitled "Elastic Tube Alignment and Fastening System for Providing Precise Alignment and Fastening of Components," inventors: Steven E. Morris and Jennifer P. Lawall.

U.S. Appl. No. 14/031,647, filed Sep. 19, 2013, entitled "Elastically Averaged Alignment Systems and Methods," inventors: Steven E. Morris, Joel Colombo, Jennifer P. Lawall, Jeffrey L. Konchan, and Steve J. Briggs.

U.S. Appl. No. 14/038,241, filed Sep. 26, 2013, entitled "Serviceable Aligning and Self-Retaining Elastic Arrangement for Mated Components and Method," inventors: Steven E. Morris, Jennifer P. Lawall and Joel Colombo.

U.S. Appl. No. 14/039,614, filed Sep. 27, 2013, entitled "Elastically Averaged Alignment Systems and Methods," inventor: Steven E. Morris.

U.S. Appl. No. 14/044,199, filed Oct. 2, 2013, entitled "Lobular Elastic Tube Alignment and Retention System for Providing Precise Alignment of Components," inventors: Steven E. Morris and Jennifer P. Lawall.

U.S. Appl. No. 14/044,207, filed Oct. 2, 2013, entitled "Elastic Aperture Alignment System for Providing Precise Four-Way Alignment of Components," inventors: Steven E. Morris and Jennifer P. Lawall.

U.S. Appl. No. 14/045,463, filed Oct. 3, 2013, entitled "Elastically Averaged Alignment Systems and Methods," inventors: Steven E. Morris and Jennifer P. Lawall.

U.S. Appl. No. 14/081,361, filed Nov. 15, 2013, entitled "Elastically Deformable Clip and Method," inventors: Steven E. Morris, Jennifer P. Lawall and Jeffrey M. Gace.

U.S. Appl. No. 14/104,321, filed Dec. 12, 2013, entitled "Alignment and Retention System for a Flexible Assembly," inventors: Steven E. Morris and Jennifer P. Lawall.

U.S. Appl. No. 14/104,327, filed Dec. 12, 2013, entitled "Self-Retaining Alignment System for Providing Precise Alignment and Retention of Components," inventors: Steven E. Morris, Jennifer P. Lawall and Toure D. Lee.

U.S. Appl. No. 14/104,333, filed Dec. 12, 2013, entitled "Alignment System for Providing Precise Alignment and Retention of Components of a Sealable Compartment," inventors: Steven E. Morris, Christopher J. Georgi, Jennifer P. Lawall and Gordan N. Noll.

U.S. Appl. No. 14/104,541, filed Dec. 12, 2013, entitled "Alignment and Retention System for Providing Precise Alignment and Retention of Components," inventors: Steven E. Morris and Jennifer P. Lawall.

U.S. Appl. No. 14/104,549, filed Dec. 12, 2013, entitled "Alignment System for Providing Alignment of Components Having Contoured Features," inventors: Steven E. Morris and Jennifer P. Lawall.

U.S. Appl. No. 14/108,921, filed Dec. 17, 2013, entitled "Elastically Averaged Alignment Systems and Methods Thereof," inventors: Steven E. Morris and Jennifer P. Lawall.

(56) References Cited

OTHER PUBLICATIONS

U.S. Appl. No. 14/108,931, filed Dec. 17, 2013, entitled "Elastically Averaged Strap Systems and Methods," inventors: Steven E. Morris and Jennifer P. Lawall.
U.S. Appl. No. 14/109,296, filed Dec. 17, 2013, entitled "Fastener for Operatively Coupling Matable Components," inventors: Steven E. Morris and Jennifer P. Lawall.
U.S. Appl. No. 14/134,622, filed Dec. 19, 2013, entitled "Elastic Averaging Alignment Member," inventors: Steven E. Morris and Jennifer P. Lawall.
U.S. Appl. No. 14/134,801, filed Dec. 19, 2013, entitled "Elastically Averaged Alignment Systems and Methods," inventors: Steven E. Morris and Jennifer P. Lawall.
U.S. Appl. No. 14/134,844, filed Dec. 19, 2013, entitled "Elastically Deformable Module Installation Assembly," inventors: Steven E Morris and Jennifer P. Lawall.
U.S. Appl. No. 14/134,888, filed Dec. 19, 2013, entitled "Elastic Retaining Assembly and Method," inventors: Steven E. Morris and Jennifer P. Lawall.
U.S. Appl. No. 14/136,502, filed Dec. 20, 2013, entitled "Elastically Averaged Alignment Systems and Methods," inventors: Timothy A. Kiester, Steven E. Morris, Kenton L. West, Scott J. Fast, and Evan Phillips.
U.S. Appl. No. 14/151,279, filed Jan. 9, 2014, entitled "Elastically Averaged Alignment Systems and Methods," inventors: Steven E. Morris and Jennifer P. Lawall.
U.S. Appl. No. 14/153,741, filed Jan. 13, 2014, entitled "Elastically Averaged Assembly for Closure Applications," inventors: Steven E. Morris, Jeffrey A. Abell, Jennifer P. Lawall, and Jeffrey L. Konchan.
U.S. Appl. No. 14/180,882, filed Feb. 14, 2014, entitled "Elastic Tube Alignment System for Precisely Locating Components," inventor: Steven E. Morris.
U.S. Appl. No. 14/181,142, filed Feb. 14, 2014, entitled "Elastic Tube Alignment System for Precisely Locating Components," inventor: Steven E. Morris.
U.S. Appl. No. 14/185,422, filed Feb. 20, 2014, entitled "Elastically Averaged Alignment Systems and Methods," inventors: Joel Colombo, Steven E. Morris, Jennifer P. Lawall and Ashish M. Gollapalli.
U.S. Appl. No. 14/185,472, filed Feb. 20, 2014, entitled "Elastically Averaged Alignment Systems and Method," inventors: Steven E. Morris, Jennifer P. Lawall and Kee Hyuk Im.
U.S. Appl. No. 14/231,395, filed Mar. 31, 2014, entitled "Elastically Averaged Alignment Systems and Methods," inventors: Joel Colombo, Steven E. Morris, Jennifer P. Lawall, and Ashish M. Gollapalli.
U.S. Appl. No. 14/249,746, filed Apr. 10, 2014, entitled "Elastically Averaged Alignment Systems and Methods," inventors: Joel Colombo and Catherine A. Ostrander.
U.S. Appl. No. 14/259,747, filed Apr. 23, 2014, entitled "System for Elastically Averaging Assembly of Components," inventors: Steven E. Morris and Jennifer P. Lawall.
Cross-sectional view of a prior art infrared welded assembly of BMW, Munich, Germany. Believed on the market since about Jan. 1, 2010.
"Elastic Averaging in Flexture Mechanisms: A Multi-Beam Parallelleaogram Flexture Case-Study" by Shorya Awtar and Edip Sevincer, Proceedings of IDETC/CIE 2006, Paper DETC2006-99752, American Society of Mechanical Engineers (ASME), Sep. 2006.
"An Anti Backlash Two-Part Shaft Coupling With Interlocking Elastically Averaged Teeth" by Mahadevan Balasubramaniam, Edmund Golaski, Seung-Kil Son, Krishnan Sriram, and Alexander Slocum, Precision Engineering, V. 26, No. 3, Elsevier Publishing, Jul. 2002.
"The Design of High Precision Parallel Mechnisms Using Binary Actuation and Elastic Averaging: With Application to MRI Cancer Treatment" by L.M. Devita, J.S. Plante, and S. Dubowsky, 12th IFToMM World Congress (France), Jun. 2007.

"Passive Alignment of Micro-Fluidic Chips Using the Principle of Elastic Averaging" by Sitanshu Gurung, Thesis, Louisiana State University, Dept. of Mechanical Engineering, Dec. 2007.
"Precision Connector Assembly Using Elastic Averaging" by Patrick J. Willoughby and Alexander H. Slocum, Massachusetts Institute of Technology (MIT), Cambridge, MA, American Society for Precision Engineering, 2004.
U.S. Appl. No. 13/229,926, filed Sep. 12, 2011, entitled "Using Elastic Averaging for Alignment of Battery Stack, Fuel Cell Stack, or Other Vehicle Assembly", inventors: Mark A. Smith, Ronald Daul, Xiang Zhao, David Okonski, Elmer Santos, Lane Lindstrom, and Jeffrey A. Abell.
U.S. Appl. No. 13/330,718, filed Dec. 20, 2011, entitled "Precisely Locating Components in an Infrared Welded Assembly", inventor: Steven E. Morris.
U.S. Appl. No. 13/459,118, filed Apr. 28, 2012, entitled "Stiffened Multi-Layer Compartment Door Assembly Utilizing Elastic Averaging," inventor: Steven E. Morris.
U.S. Appl. No. 13/567,580, filed Aug. 6, 2012, entitled "Semi-Circular Alignment Features of an Elastic Averaging Alignment System", inventors: Steven E. Morris and Thomas F. Bowles.
U.S. Appl. No. 13/570,959, filed Aug. 9, 2012, entitled "Elastic Cantilever Beam Alignment System for Precisely Aligning Components", inventor: Steven E. Morris.
U.S. Appl. No. 13/571,030, filed Aug. 9, 2012, entitled "Elastic Tube Alignment System for Precisely Locating an Emblem Lens to an Outer Bezel", inventors: Joel Colombo, Steven E. Morris, and Michael D. Richardson.
U.S. Appl. No. 13/752,449, filed Jan. 29, 2013, entitled "Elastic Insert Alignment Assembly and Method of Reducing Positional Variation", inventors: Steven E. Morris and Michael D. Richardson.
U.S. Appl. No. 13/755,759, filed Jan. 31, 2013, entitled "Elastic Alignment Assembly for Aligning Mated Components and Method of Reducing Positional Variation", inventors: Joel Colombo, Michael D. Richardson, and Steven E. Morris.
U.S. Appl. No. 13/851,222, filed Mar. 27, 2013, entitled "Elastically Averaged Alignment System", inventors: Joel Colombo and Steven E. Morris.
U.S. Appl. No. 13/855,928, filed Apr. 3, 2013, entitled "Elastic Averaging Alignment System, Method of Making the Same and Cutting Punch Therefor", inventors: Steven E. Morris, Jennifer P. Lawall, Joel Colombo, and Jeffrey L. Konchan.
U.S. Appl. No. 13/856,888, filed Apr. 4, 2013, entitled "Elastic Retaining Assembly for Matable Components and Method of Assembling", inventors: Steven E. Morris, Jennifer P. Lawall, Joel Colombo, and Toure D. Lee.
U.S. Appl. No. 13/856,927, filed Apr. 4, 2013, entitled "Elastic Tubular Attachment Assembly for Mating Components and Method of Mating Components", inventors: Steven E. Morris and Jennifer P. Lawall.
U.S. Appl. No. 13/856,956, filed Apr. 4, 2013, entitled "Elastic Clip Retaining Arrangement and Method of Mating Structures with an Elastic Clip Retaining Arrangement", inventors: Joel Colombo, Steven E. Morris and Jeffrey L. Konchan.
U.S. Appl. No. 13/856,973, filed Apr. 4, 2013, entitled "Elastically Deformable Flange Locator Arrangement and Method of Reducing Positional Variation", inventors: Joel Colombo, Steven E. Morris and Michael D. Richardson.
U.S. Appl. No. 13/858,478, filed Apr. 8, 2013, entitled "Elastic Mating Assembly and Method of Elastically Assembling Matable Components", inventors: Steven E. Morris and Jennifer P. Lawall.
U.S. Appl. No. 13/859,109, filed Apr. 9, 2013, entitled "Elastic Retaining Arrangement for Jointed Components and Method of Reducing a Gap Between Jointed Components," inventors: Steven E. Morris, James M. Kushner, Victoria L. Enyedy, Jennifer P. Lawall, and Piotr J. Ogonek.
U.S. Appl. No. 13/915,132, filed Jun. 11, 2013, entitled "Elastically Deformable Energy Management Arrangement and Method of Managing Energy Absorption," inventors: Steven E. Morris, Randy A. Johnson and Jennifer P. Lawall.

(56) References Cited

OTHER PUBLICATIONS

U.S. Appl. No. 13/915,177, filed Jun. 11, 2013, entitled "Elastically Deformable Energy Management Assembly and Method of Managing Energy Absorption," inventors: Steven E. Morris, Jennifer P. Lawall, and Randy Johnson.

U.S. Appl. No. 13/917,005, filed Jun. 13, 2013, entitled "Elastic Attachment Assembly and Method of Reducing Positional Variation and Increasing Stiffness," inventors: Steven E. Morris and Jennifer P. Lawall.

U.S. Appl. No. 13/917,074, filed Jun. 13, 2013, entitled "Elastically Deformable Retaining Hook for Components to be Mated Together and Method of Assembling", inventors: Joel Colombo, Jeffrey L. Konchan, Steven E. Morris, and Steve J. Briggs.

U.S. Appl. No. 13/918,183, filed Jun. 14, 2013, entitled "Elastic Retaining Assembly for Matable Components and Method of Assembling," inventors: Steven E. Morris and Jennifer P. Lawall.

\* cited by examiner

US 9,556,890 B2

ELASTIC ALIGNMENT ASSEMBLY FOR ALIGNING MATED COMPONENTS AND METHOD OF REDUCING POSITIONAL VARIATION

FIELD OF THE INVENTION

The present invention relates to an elastic alignment assembly for aligning mated components, as well as a method of reducing positional variation for components of a matable assembly.

BACKGROUND

Currently, components which are to be mated together in a manufacturing process are subject to positional variation based on the mating arrangements between the components. One common arrangement includes components mutually located with respect to each other by 2-way and/or 4-way male alignment features; typically undersized structures which are received into corresponding oversized female alignment features, such as apertures in the form of holes and/or slots. Alternatively, adhesives or welding processes may be employed to mate parts. Irrespective of the precise mating method, there is a clearance between at least a portion of the alignment features which is predetermined to match anticipated size and positional variation tolerances of the mating features as a result of manufacturing (or fabrication) variances. As a result, occurrence of significant positional variation between the mated components, which contributes to the presence of undesirably large and varying gaps and otherwise poor fit, is possible. Additional undesirable effects may include squeaking and rattling of the mated components, for example.

SUMMARY OF THE INVENTION

In one exemplary embodiment, an elastic alignment assembly for aligning mated components includes a first component having a first engagement surface. Also included is a second component having a second engagement surface, the second component configured to be mated with the first component. Further included is at least one receiving feature formed in at least one of the first engagement surface and the second engagement surface. Yet further included is at least one protrusion comprising a first sidewall and a second sidewall, the at least one protrusion extending away from at least one of the first engagement surface and the second engagement surface, the at least one protrusion formed of an elastically deformable material to elastically deform at a first interface and a second interface upon contact with the at least one receiving feature, wherein the first interface is located proximate the first sidewall and the at least one receiving feature, and wherein the second interface is located proximate the second sidewall and the at least one receiving feature.

In another exemplary embodiment, a method of reducing positional variation of a matable assembly is provided. The method includes inserting at least one protrusion of a first component into at least one receiving feature of a second component, wherein the at least one protrusion comprises a protrusion width and the at least one receiving feature comprises a receiving feature width. The method also includes contacting a first sidewall and a second sidewall of the at least one protrusion with the at least one receiving feature. The method further includes elastically deforming at least one of the first sidewall and the second sidewall upon contacting the at least one receiving feature, wherein the elastic deforming is facilitated by a recess formed in the at least one protrusion between the first sidewall and the second sidewall. The method yet further includes performing an elastic averaging of the elastic deformation over the first sidewall and the second sidewall, wherein upon reaching a fully engaged position of the at least one protrusion a fitted alignment between the first component and the second component is established.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
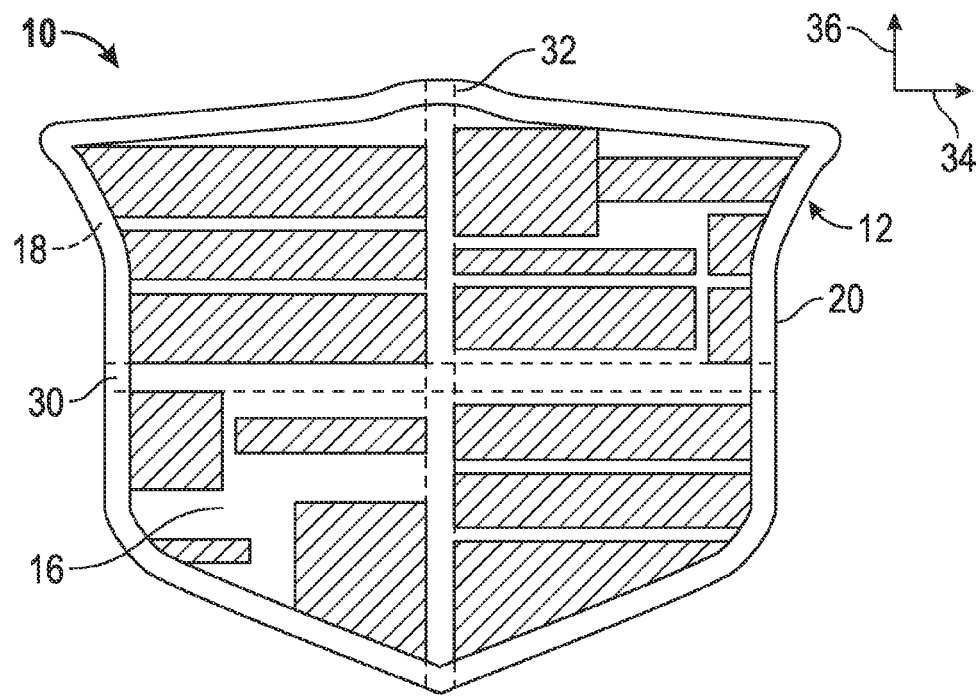
FIG. 1 is a front elevation view of a first component of a matable assembly.
Figure 2:
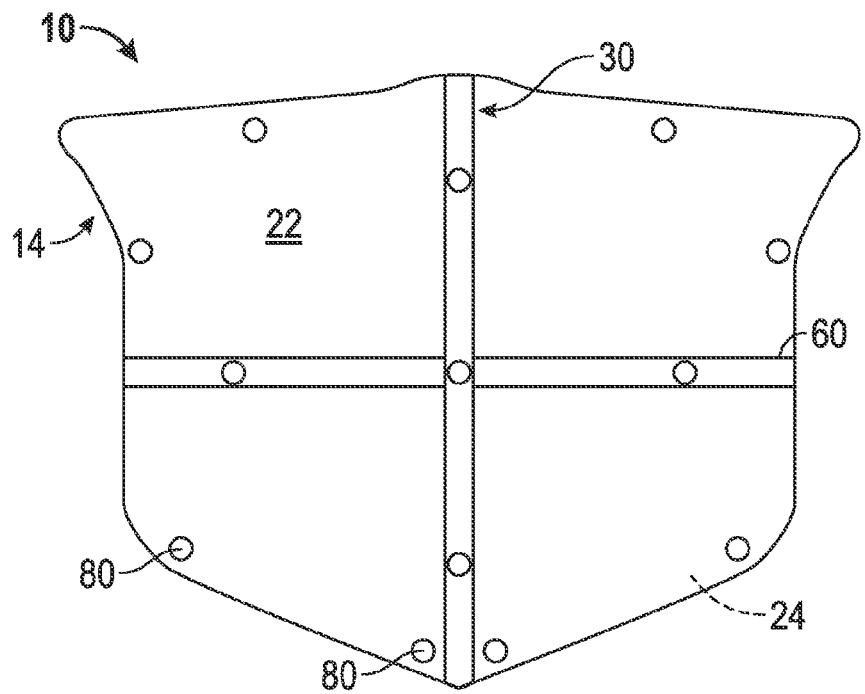
FIG. 2 is front elevation view of a second component of the matable assembly.

Referring to FIGS. 1 and 2, a matable assembly 10 is illustrated. The matable assembly 10 comprises matable components, such as a first component 12 and a second component 14 that may be disposed in a mated configuration with respect to each other. In one embodiment, the matable assembly is employed in a vehicle application, and comprises a vehicle feature such as a vehicle emblem. However, it is to be understood that the components may be associated with numerous other applications and industries, such as home appliance and aerospace applications, for example. In an exemplary embodiment such as a vehicle emblem for an automobile, the first component 12 comprises an emblem and the second component 14 comprises a bezel for receiving the emblem.

Although illustrated in a specific geometry, the first component 12 and the second component 14 may be configured in countless geometries. Irrespective of the precise geometry of the first component 12 and the second component 14, the second component 14 is configured to align with and fittingly mate with the first component 12, which will be described in detail below. In an alternative embodiment, rather than two components comprising the matable assembly 10, additional layers or components may be included.

The first component 12 includes a first surface 16 and a second surface 18, which may also be referred to as a first engagement surface, that are typically substantially planar surfaces spaced from one another and arranged in planes relatively parallel to each other. In an alternative embodiment, the first surface 16 and the second surface 18 are curvilinear, rather than relatively planar and are merely spaced from one another. Regardless of the precise geometry of the first surface 16 and the second surface 18, the first surface 16 and the second surface 18 are connected along a perimeter of the first component 12 by at least one perimeter wall 20. In the illustrated embodiment, the at least one perimeter wall 20 includes a plurality of segments or individual walls, but is referred to herein as the at least one perimeter wall 20.

The second component 14 includes a third surface 22, which may also be referred to as a second engagement surface, and a fourth surface 24, that are typically substantially planar surfaces spaced from one another and arranged in planes relatively parallel to each other. Also similar to the first component 12, it is contemplated that the third surface 22 and the fourth surface 24 are curvilinear or include various protrusions and/or detents.

Generally and schematically illustrated is an elastic alignment assembly 30 that is used in conjunction with the matable assembly 10. It is to be appreciated that the elastic alignment assembly 30 is to be employed for providing a self-aligning relationship between components, such as the first component 12 and the second component 14, to each other, while also assisting in securely mating the components to each other. The elastic alignment assembly 30 is integrally formed with, or operatively coupled to, the second surface 18 (i.e., first engagement surface) and the third surface 22 (i.e., second engagement surface). As shown, a portion of the elastic alignment assembly 30 extends from the second surface 18 of the first component 12 toward the third surface 22 of the second component 14 and may span a portion of the second surface 18 or an entire dimension (e.g., length, width, height, etc.) of the second surface 18. Similarly, another portion of the elastic alignment assembly 30 extends from the third surface 22 of the second component 14 toward the second surface 18 of the first component 12 and may span a portion of the third surface 22 or an entire dimension (e.g., length, width, height, etc.) of the third surface 22.

Figure 3:
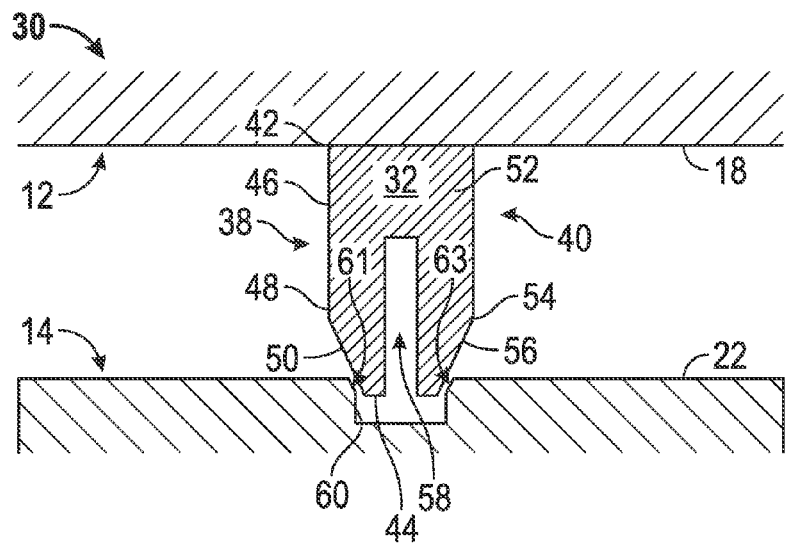
FIG. 3 is a cross-sectional view of an elastic alignment assembly prior to insertion of a protrusion into a receiving feature.
Figure 4:
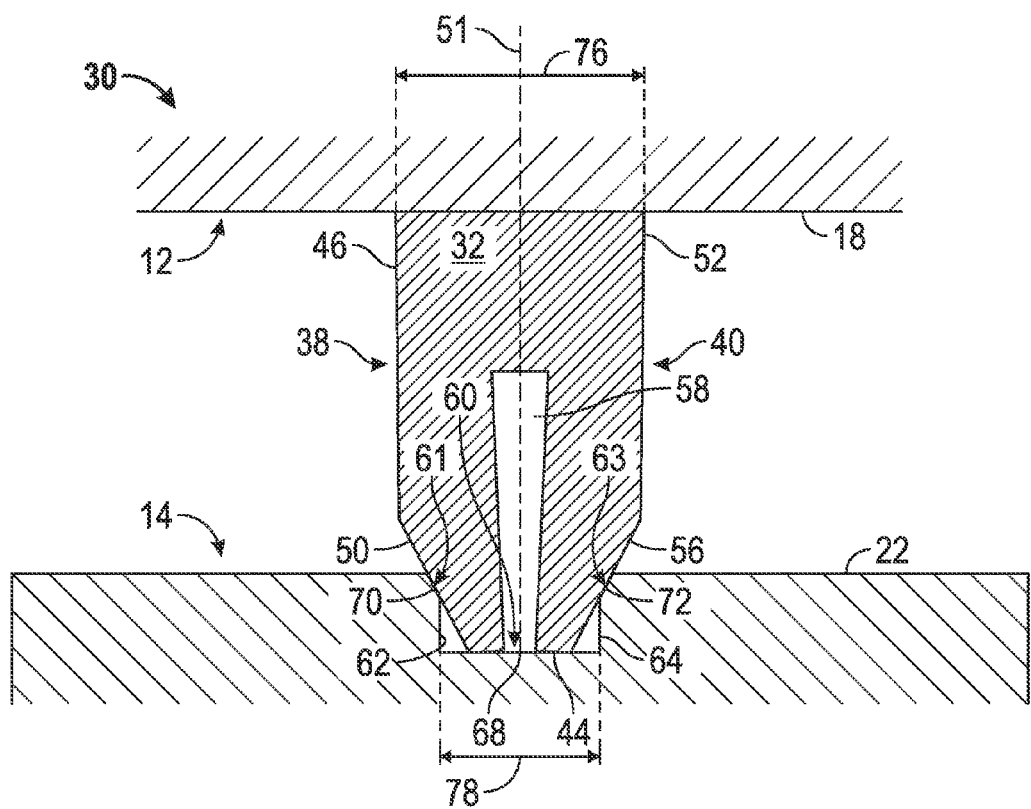
FIG. 4 is a cross-sectional view of the protrusion disposed in an interference fit with the receiving feature.

Referring now to FIGS. 3 and 4, the elastic alignment assembly 30 is illustrated in greater detail than the schematic illustrations of FIGS. 1 and 2. The elastic alignment assembly 30 comprises a protrusion 32 extending away from the second surface 18 of the first component 12. The protrusion 32 may be integrally formed with or operatively coupled to the first component 12 and may be formed of various geometries. In one embodiment, the protrusion 32 extends in a longitudinally extended manner across an entire span of the second surface 18, as noted above. The direction in which the protrusion 32 extends may include a first direction 34 (FIG. 1), such as a horizontal or cross-car direction in the illustrated embodiment, and/or a second direction 36, such as a vertical direction in the illustrated embodiment. Additionally, the protrusion 32 may be located central to the second surface 18, with respect to the first direction 34 and/or the second direction 36. Orientation of the protrusion 32 in one or both of these directions facilitates precise alignment of the first component 12 relative to the second component 14 by accounting for positional and/or tolerance variation of the retaining and/or locating features of the first component 12 and the second component 14 inherently present due to manufacturing processes. The self-aligning benefits associated with the elastic alignment assembly 30 will be described in detail below.

As shown in the illustrated embodiment, the protrusion 32 includes a first sidewall 38 and a second sidewall 40 extending from a first end 42 proximate the second surface 18 to a second end 44 located distally from the first end 42. In an exemplary embodiment, the first sidewall 38 comprises a first portion 46 extending from the first end 42 to an intermediate location 48 of the first sidewall 38 in an orientation relatively perpendicular to the second surface 18. The first sidewall 38 also includes a second portion 50 extending from the intermediate location 48 to the second end 44 of the first sidewall 38. The second portion 50 is disposed at an angle to the first portion 46, and more specifically at an angle that tapers inwardly toward the second sidewall 40, or towards a center axis 51. The second sidewall 40 comprises a third portion 52 extending from the first end 42 of the protrusion 32 to an intermediate location 54 of the second sidewall 40 in an orientation relatively perpendicular to the second surface 18. The second sidewall 40 also includes a fourth portion 56 extending from the intermediate location 54 of the second sidewall 40 to the second end 44 of the second sidewall 40. The fourth portion 56 is disposed at an angle to the third portion 52, and more specifically at an angle that tapers inwardly toward the first sidewall 38. Extending longitudinally through the protrusion 32 is a recess 58 disposed at the second end 44 of the protrusion 32 between the first sidewall 38 and the second sidewall 40. The recess 58 extends axially from the second end 44 toward the first end 42 of the protrusion 32, terminating intermediate of the first and second ends 42, 44, respectively.

The elastic alignment assembly 30 also comprises a receiving feature 60 extending into the third surface 22 of the second component 14. The receiving feature 60 may be integrally formed with or operatively coupled to the second component 14 and may be formed of various geometries. In one embodiment, the receiving feature 60 is a trough extending in a longitudinally extended manner across an entire span of the third surface 22. The direction in which the receiving feature 60 extends may include the first direction 34 and/or the second direction 36. As described above, the receiving feature 60 may be disposed in various locations along the third surface 22 and may be of various shapes, including the trough noted above or apertures, for example. Multiple embodiments of the receiving feature 60 are contemplated that are suitable for receiving a protrusion 32 of the first component 12, including longitudinally extending or spatially located receiving features.

In the illustrated embodiment of the receiving feature 60 (FIG. 4), a first wall 62 and a second wall 64 are included, with a base wall 68 extending therebetween and connecting the first wall 62 and the second wall 64. The first wall 62 and the second wall 64 respectively include a first chamfer portion 61 and a second chamfer portion 63, which are each disposed at a distal end from the base wall 68. The first chamfer portion 61 and the second chamfer portion 63 comprise beveled surfaces of the receiving feature 60 and are configured to provide a "lead-in," or guide, region for the first sidewall 38 and the second sidewall 40 of the protrusion 32. Numerous angles of the first chamfer portion 61 and the second chamfer portion 63 are contemplated. In addition to the "lead-in," or guide, benefit provided by the first chamfer portion 61 and the second chamfer portion 63, the angled surfaces increase a contact interference condition between the protrusion 32 and the receiving feature 60 by increasing a compressive surface area that imparts a compressive force on the protrusion 32. Although illustrated as a trough-like recess within the third surface 22 of the second component 14, it is to be appreciated that the receiving feature 60 may be an opening or bore, or the like, provided the receiving feature 60 includes one or more surfaces configured to engage the first sidewall 38 and the second sidewall 40 of the protrusion 32. Although described above as an embodiment having the protrusion 32 integrally formed with or operatively coupled to the first component 12 and the receiving feature 60 integrally formed with or operatively coupled to the second component 14, it is to be understood that a reversed configuration may be employed. Specifically, the protrusion 32 may be coupled to the second component 14, while the receiving feature 60 is coupled to the first component 12. Furthermore, a combination of the two aforementioned embodiments is contemplated. Additionally, a plurality of one or both of the protrusion 32 and the receiving feature 60 may be present.

The protrusion 32 of the first component 12 is positioned and engaged with the receiving feature 60 of the second component 14 upon translation of the first component 12 toward the base wall 68. The first sidewall 38 and the second sidewall 40 of the protrusion 32 engage the first wall 62 and the second wall 64, respectively, at a position spaced from the base wall 68 within the receiving feature 60. Subsequent translation of the protrusion 32 toward the base wall 68 results in an elastic deformation at a first interface 70 between the first sidewall 38 and the first wall 62, as well as at a second interface 72 between the second sidewall 40 and the second wall 64. Depending on the positional variance of the features of the first component 12 and the second component 14, elastic deformation of one or both of the first sidewall 38 and the second sidewall 40 may occur in response to resistance imposed on the first sidewall 38 and the second sidewall 40 by the receiving feature 60. An elastically deformed condition is illustrated in FIG. 4. It is to be appreciated that elastic deformation of the protrusion 32 is further facilitated by the presence of the recess 58 disposed between the first sidewall 38 and the second sidewall 40. The void of material defining the recess 58 enhances the flexibility of the protrusion 32 in regions closely located to the recess 58.

Any suitable elastically deformable material may be used for the protrusion 32. More specifically, elastically deformable material is disposed proximate, or integral to, the first sidewall 38 and the second sidewall 40. This includes various metals, polymers, ceramics, inorganic materials or glasses, or composites of any of the aforementioned materials, or any other combinations thereof. Many composite materials are envisioned, including various filled polymers, including glass, ceramic, metal and inorganic material filled polymers, particularly glass, metal, ceramic, inorganic or carbon fiber filled polymers. Any suitable filler morphology may be employed, including all shapes and sizes of particulates or fibers. More particularly any suitable type of fiber may be used, including continuous and discontinuous fibers, woven and unwoven cloths, felts or tows, or a combination thereof. Any suitable metal may be used, including various grades and alloys of steel, cast iron, aluminum, magnesium or titanium, or composites thereof, or any other combinations thereof. Polymers may include both thermoplastic polymers or thermoset polymers, or composites thereof, or any other combinations thereof, including a wide variety of co-polymers and polymer blends. In one embodiment, a preferred plastic material is one having elastic properties so as to deform elastically without fracture, as for example, a material comprising an acrylonitrile butadiene styrene (ABS) polymer, and more particularly a polycarbonate ABS polymer blend (PC/ABS), such as an ABS acrylic. The material may be in any form and formed or manufactured by any suitable process, including stamped or formed metal, composite or other sheets, forgings, extruded parts, pressed parts, castings, or molded parts and the like, to include the deformable features described herein. The material, or materials, may be selected to provide a predetermined elastic response characteristic of the protrusion 32. The predetermined elastic response characteristic may include, for example, a predetermined elastic modulus.

The precise position where engagement between the first sidewall 38 and the second sidewall 40 and the receiving feature 60 occurs will vary depending on positional variance imposed by manufacturing factors. Due to the elastically deformable properties of the elastic material comprising the protrusion 32, the criticality of the initial location of engagement is reduced. Further insertion of the protrusion 32 into the receiving feature 60 toward the base wall 68 ultimately leads to a fully engaged position of the protrusion 32, as illustrated in FIG. 4. As shown, the second end 44 of the protrusion 32 may engage the base wall 68 of the receiving feature 60 in an embodiment having a protrusion length extending along an entire length of the first engagement surface and the second engagement surface. Additionally, it is to be understood that the second end 44 may not contact the base wall 68. The sizes of the protrusion 32 and the receiving feature 60, as well as the elastic properties of the elastic material(s), ultimately dictate the fully engaged position.

Irrespective of the precise location of the fully engaged position, a tight, fitted engagement between the protrusion 32 and the receiving feature 60 is achieved by frictional forces present at the interfaces of the first sidewall 38 and the second sidewall 40 with the first wall 62 and the second wall 64, respectively. Such a condition is ensured by sizing a protrusion width 76 to be larger than a receiving feature width 78. The protrusion width 76 is defined by the distance between the first sidewall 38 and the second sidewall 40, and in one embodiment is defined by the distance between the first portion 46 of the first sidewall 38 and the third portion 52 of the second sidewall 40. The receiving feature width 78 is defined by the distance between the first wall 62 and the second wall 64. The interference between the protrusion 32 and the receiving feature 60 causes elastic deformation proximate the contacted surfaces. The malleability of the materials reduces issues associated with positional variance. More particularly, in contrast to a rigid insert that typically results in gaps between the insert and receiving structure at portions around the perimeter of the insert, the protrusion 32 advantageously deforms to maintain alignment of the first component 12 and the second component 14, while also reducing or eliminating gaps associated with manufacturing challenges.

While contemplated that sufficient friction forces may be imposed at the interfaces of the protrusion 32 and the receiving feature 60 to align and retain the first component 12 to the second component 14, additional retaining features may be included. In such an embodiment, the first component 12 includes one or more retaining features (not illustrated), such as pins, that extend away from the second surface 18 of the first component 12 and are configured to be inserted within one or more corresponding apertures 80 of the second component 14. The retaining features are undersized relative to the one or more corresponding apertures 80 to account for positional variation associated with manufacturing processes. In operation, once the retaining features are inserted into the one or more corresponding apertures 80 and the protrusion 32 is engaged with the receiving feature 60, a heat staking process is employed to mechanically fasten the retaining features and the one or more corresponding apertures 80, and thereby fastening the first component 12 to the second component 14. Upon heat staking the retaining features, the mating process mechanically manipulates an interface between the first component 12 and the second component 14 to cause the components to tend toward misalignment, but the elastic alignment assembly 30 counteracts the tendency to misalign by elastically deforming to maintain the alignment positioning of the first component 12 relative to the second component 14. In addition to or as an alternative to heat staking, the first component 12 and the second component 14 may include various other retaining features, such as an adhesive substance or tape, for example.

Regardless of whether the first component 12 and the second component 14 are retained by only the elastic alignment assembly 30 or additional retaining features, the elastic deformation of the protrusion 32 elastically averages any positional errors of the first component 12 and the second component 14. The averaging is performed in aggregate in relation to an amount of deformation of the first sidewall 38 and the second sidewall 40. In other words, gaps that would otherwise be present due to positional errors associated with portions or segments of the first component 12 and the second component 14, particularly locating and retaining features, are eliminated by offsetting the gaps with an over-constrained condition along other portions or segments of the protrusion 32 and the receiving feature 60. The principles of elastic averaging are described in detail in commonly owned, co-pending U.S. patent application Ser. No. 13/187,675, the disclosure of which is incorporated by reference herein in its entirety.

Figure 5:
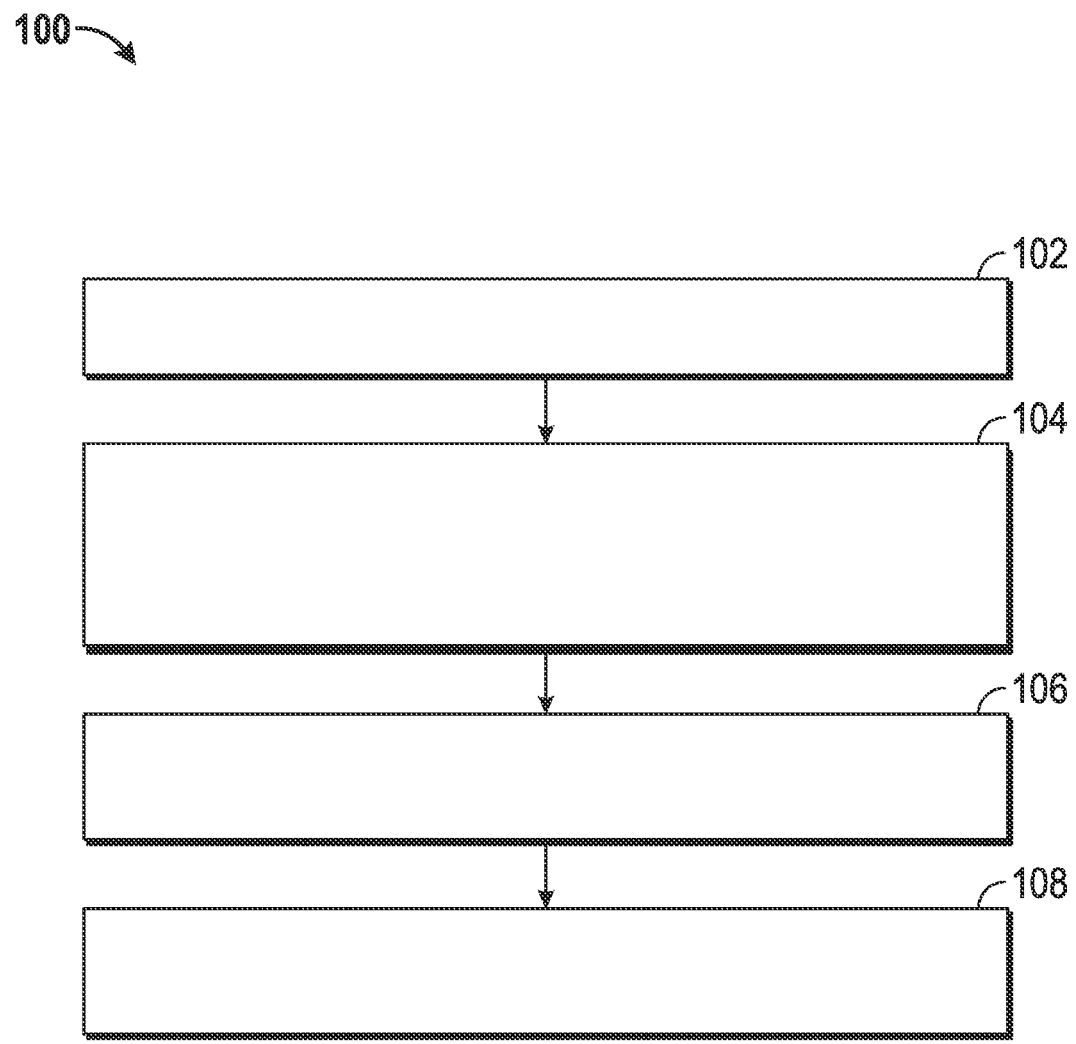
FIG. 5 is a flow diagram illustrating a method of reducing positional variation of the matable assembly.

A method of reducing positional variation of a matable assembly 100 is also provided, as illustrated in FIG. 5, and with reference to FIGS. 1-4. The matable assembly 10 and the elastic alignment assembly 30, and more specifically the elastically deformable nature of the protrusion 32 have been previously described and specific structural components need not be described in further detail. The method of reducing positional variation of an elastic alignment assembly 100 includes inserting 102 the protrusion 32 into the receiving feature 60. The method also includes contacting 104 the first sidewall 38 and the second sidewall 40 with the receiving feature 60. The method further includes elastically deforming 106 one or both of the first sidewall 38 and the second sidewall 40 upon contacting 104 the receiving feature 60, wherein the recess 58 facilitates the elastic deformation. The method yet further includes performing 108 an elastic averaging of the elastic deformation over the first sidewall 38 and the second sidewall 40.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. An elastic alignment assembly for aligning mated components comprising:
    a first component having a first engagement surface;
    a second component having a second engagement surface, the second component configured to be mated with the first component;
    at least one receiving feature formed in at least one of the first engagement surface and the second engagement surface, the receiving feature comprising a closed ended cavity defined by at least one receiving feature sidewall and a receiving feature base wall; and
    at least one protrusion comprising a first sidewall and a second sidewall and a recess disposed between the first sidewall and the second sidewall, the at least one protrusion extending away from at least one of the first engagement surface and the second engagement surface, the at least one protrusion formed of an elastically deformable material to elastically deform at a first interface and a second interface upon contact with the at least one receiving feature, wherein the first interface is located proximate the first sidewall and the at least one receiving feature, and wherein the second interface is located proximate the second sidewall and the at least one receiving feature, the at least one protrusion comprising a first end and a second end, the first end connected to the first engagement surface or the second engagement surface, wherein the first sidewall comprises a first portion and a second portion, wherein the first portion extends relatively perpendicularly from the first end of the at least one protrusion, and wherein the second portion extends from the first portion to the second end of the at least one protrusion at an inwardly tapered angle toward the second sidewall.

2. The elastic alignment assembly of claim 1, wherein the second sidewall comprises a third portion and a fourth portion, wherein the third portion extends relatively perpendicularly from the first end of the at least one protrusion, and wherein the fourth portion extends from the third portion to the second end of the at least one protrusion at an inwardly tapered angle toward the first sidewall.

3. The elastic alignment assembly of claim 2, wherein the at least one protrusion comprises a protrusion width and the at least one receiving feature comprises a receiving feature width, wherein the protrusion width is greater than the receiving feature width, and wherein the receiving feature includes a first chamfer portion configured to contact the first sidewall and a second chamfer portion configured to contact the second sidewall.

4. The elastic alignment assembly of claim 3, wherein the protrusion width is defined by a distance between the first portion of the first sidewall and the third portion of the second sidewall.

5. The elastic alignment assembly of claim 1, wherein the at least one protrusion comprises a protrusion length and the at least one receiving feature comprises a receiving feature length.

6. The elastic alignment assembly of claim 5, wherein the protrusion length and the receiving feature length extend along an entire length of the first engagement surface and the second engagement surface.

7. The elastic alignment assembly of claim 1, wherein the at least one protrusion comprises a first protrusion centrally disposed relative to a first direction of the first engagement surface, and wherein the at least one receiving feature comprises a first receiving feature centrally disposed relative to the second engagement surface and substantially corresponding to the first direction of the first engagement surface.

8. The elastic alignment assembly of claim 7, further comprising a second protrusion and a second receiving feature, wherein the second protrusion is disposed perpendicularly to the first protrusion, and wherein the second receiving feature is disposed perpendicularly to the first receiving feature.

9. The elastic alignment assembly of claim 1, further comprising a fully engaged position of the first component, wherein the fully engaged position comprises contact interference between the first sidewall and the second sidewall with the at least one receiving feature along an entirety of the first sidewall and the second sidewall, wherein an amount of deformation of the first sidewall and the second sidewall is averaged in aggregate.

10. The elastic alignment assembly of claim 1, wherein the first component comprises a vehicle emblem and the second component comprises a bezel.

* * * * *